United States Patent Office 3,514,671
Patented May 26, 1970

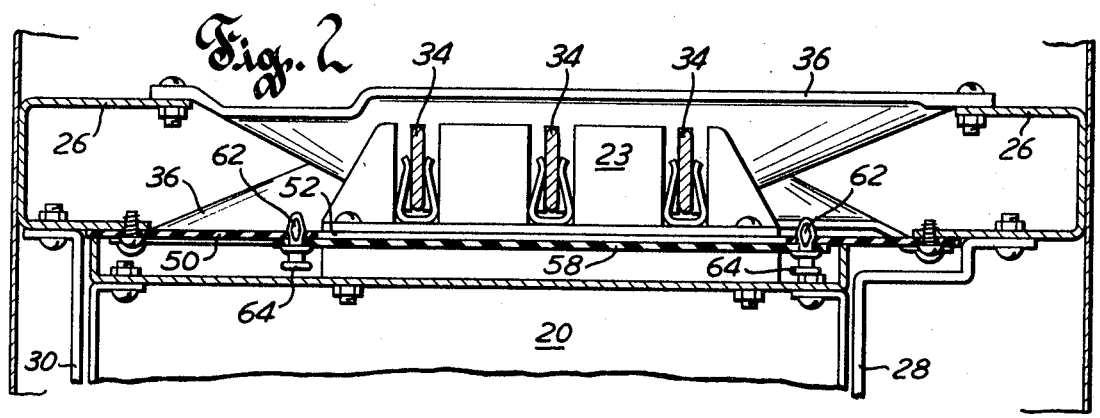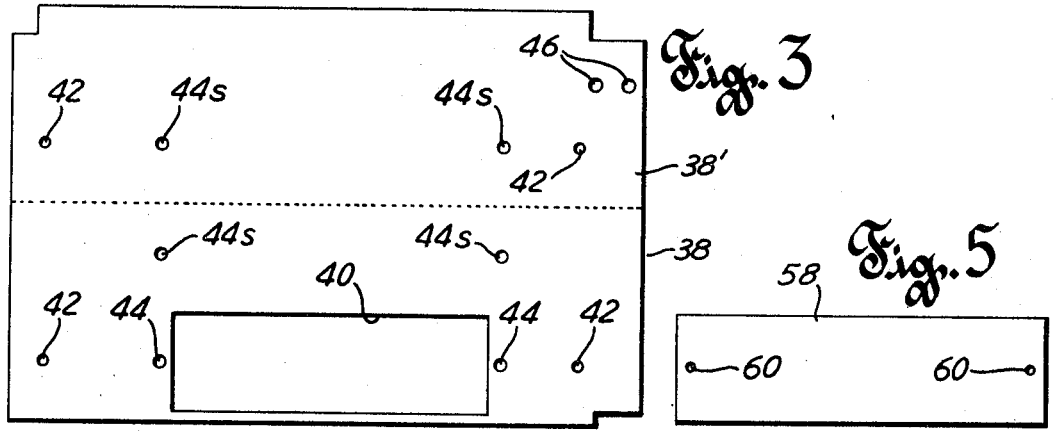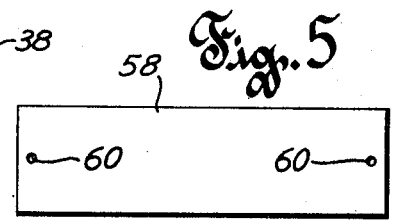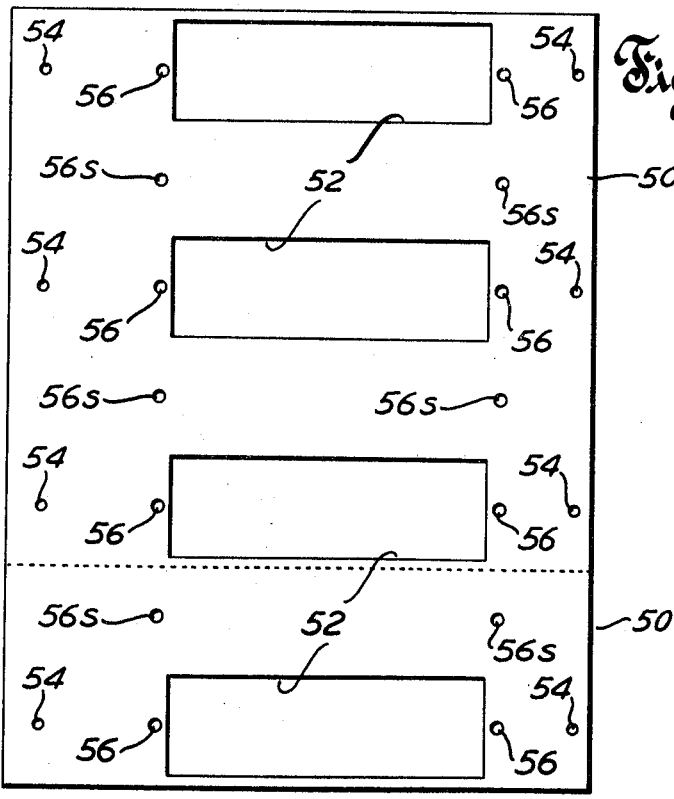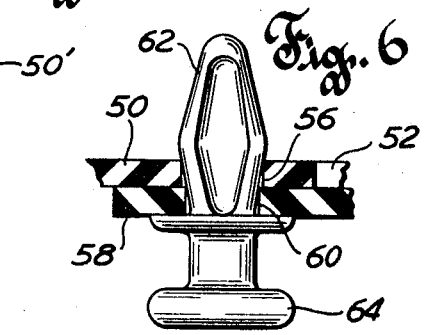

3,514,671
INSULATING BUS BAR BARRIERS WITH PLUG-IN OPENINGS AND STORABLE COVERS THEREFOR
Robert N. Eck, Whitefish Bay, Philip W. Emley, Nashotah, and Allan E. Grams, West Allis, Wis., and Karl H. Kleinert, Fullerton, Pa., assignors to Cutler-Hammer, Inc., Milwaukee, Wis., a corporation of Delaware
Filed July 24, 1968, Ser. No. 747,146
Int. Cl. H05b 11/04; H05k 5/02
U.S. Cl. 317—119                9 Claims

ABSTRACT OF THE DISCLOSURE

A sheet of electrical insulation is secured within an electrical control center cabinet to extend transversely between the sides thereof at the front of the vertical bus bars therein. The sheet is provided with regularly spaced openings to permit connection of control units to the bus bars and each opening is provided with a snap-on, removable cover which may be stored on the sheet adjacent the opening. Two basic sheet profiles may be readily modified to permit an entire cabinet to be covered by using a plurality of sheets in various profile combinations.

BACKGROUND OF THE INVENTION

This invention relates to insulating covers for electrical bus bars and particularly to such covers having provisions for plug-in connections to the bus bars.

This invention has particular utility in enclosed electrical control center apparatus wherein one or more sheet metal cabinet structures house a plurality of individual, removable control units designed to make plug-in electrical connection to vertical bus bars within the enclosures. These cabinets and the openings therein for the control units are generally quite large. As a result, a removed or otherwise absent control unit presents a relatively large amount of exposed bus bar structure to create a definite shock hazard to maintenance personnel.

Several methods of isolating the live bus bars from the cabinet fronts have been used in the past. One method has been to sleeve the bus bars with an insulating covering, the covering having been removed in the plug-in areas. Another method has been to provide female connectors, or receptacles over the bus bars within the cabinet and to cover the spaces between the receptacles with sheet form insulation as may be seen in U.S. Pat. No. 3,308,348. To further increase safety, the plug-in openings have been separated into small individual openings for each bar as may be seen in the above mentioned and in U.S. Pat. No. 3,113,820. The latter method requires that the openings in the insulating member be formed under close tolerance control to assure proper alinement of the connector pins and openings. In each of the above described methods, the connection points still leave at least a small amount of electrically live bus bar or connector exposed behind the opening when a control unit is removed and accidental contact thereof by a workman's tool or the like remains a possibility.

This invention is designed to eliminate the shock hazard when employed in its intended manner. Insulating barrier sheets are secured between the cabinet sides to extend across and to the front of the bus bars. Relatively large cut-outs, or openings, are provided at regularly spaced connection points to permit a well insulated, large electrical connector to be used with the control units. Sufficient clearance is provided by the openings to reduce the manufacturing tolerances and costs of the insulating barrier. Insulating covers are provided for each of the plug-in openings, the covers having snap fastening means thereon to facilitate their removal or replacement. The barrier sheets are further provided with means adjacent to each opening to permit a removed cover to be stored adjacent to the opening when a control unit is inserted, and to thereby be in a convenient location for the workman to replace it over the opening when a control unit is removed.

SUMMARY OF THE INVENTION

It is a primary object of this invention to provide a sheet form insulating bus bar barrier for enclosed electrical control apparatus or the like, wherein openings are provided in the barrier for connections to the bus bars and removable covers are provided to close off unused ones of said openings.

It is a further object of this invention to provide a sheet form insulating bus bar barrier for enclosed electrical control apparatus or the like, wherein openings are provided in the barrier for connection to the bus bar and means are provided adjacent to the openings for storing covers to be used to close off unused ones of said openings.

These and other objects and advantages of this invention will become more apparent in the following specification and claims when read in conjunction with the accompanying drawings.

DESCRIPTION OF THE DRAWINGS

FIG. 2 is a fragmentary sectional view taken generally along the line 2—2 of FIG. 1;

FIG. 3 is a plan view of one form of insulating barrier sheet of this invention;

FIG. 4 is a plan view of another form of insulating barrier sheet of this invention;

FIG. 5 is a plan view of the insulating cover member of this invention; and

FIG. 6 is an enlarged view of the left-hand fastener of FIG. 2 together with fragments of the cover and barrier sheet.

DESCRIPTION OF THE PREFERRED EMBODIMENTS

Figure 1:
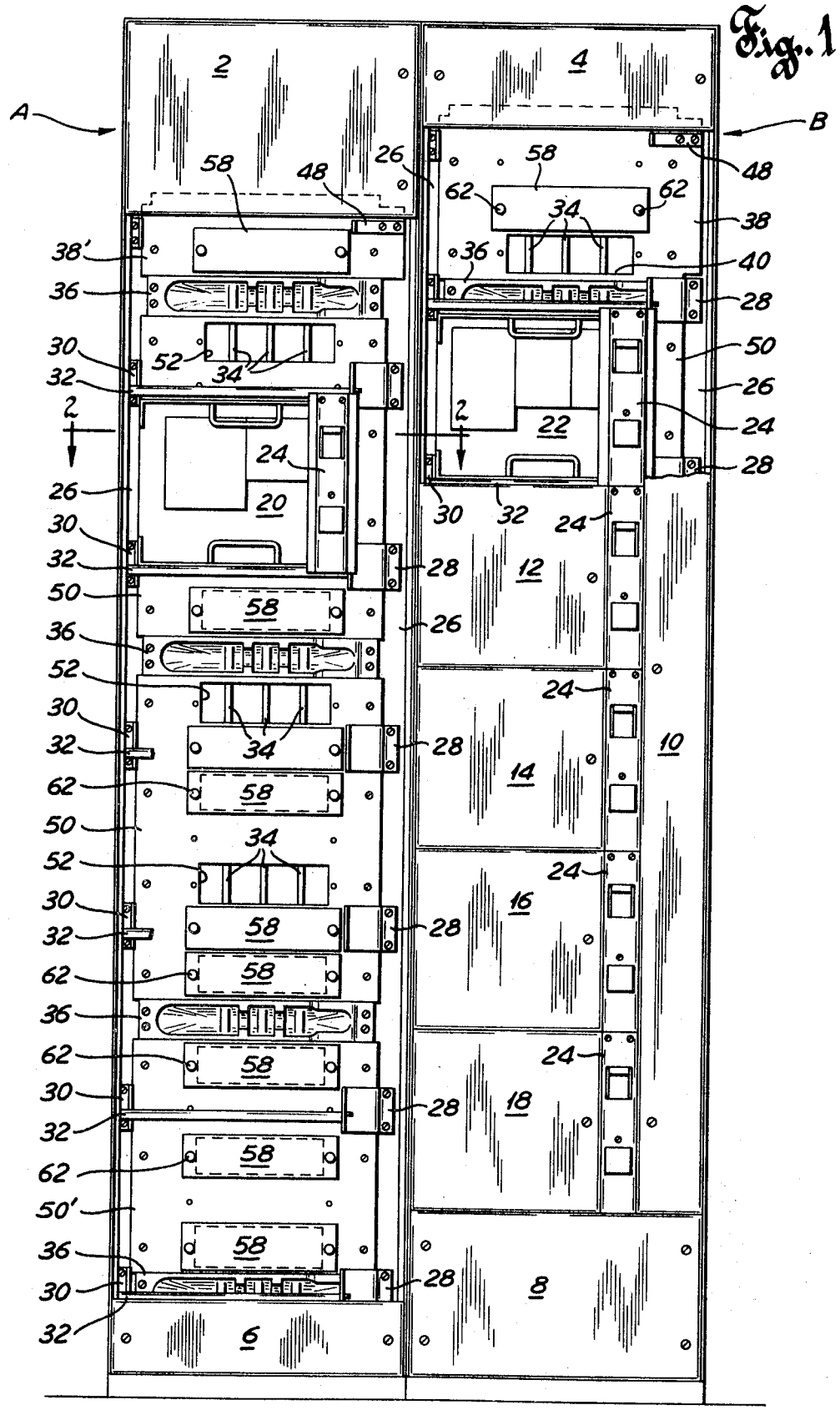
FIG. 1 is a front view of a two-section electrical control center having a number of cabinet doors and plug-in control units removed to show the insulating barrier sheets and cover members of this invention.

Referring to the drawings and particularly in FIG. 1 there is shown an enclosed electrical control center comprising two sections A and B, each of which comprises its own sheet metal cabinet structure having opposite side members, top and bottom wall members and a rear wall member. Control centers of this type are well known in the art and therefore many of the cabinetry and electrical interconnection details have been omitted from this disclosure. If desired, reference may be had to R. N. Eck Pat. No. 3,303,395, dated Feb. 7, 1967 and J. L. Defandorf et al. Pat. No. 3,140,426 dated July 7, 1964 for a further understanding of the above mentioned details.

The adjacent upper side walls of sections A and B are provided with alined openings to permit electrical interconnection between the two sections in the form of continuous horizontal bus members and connector wiring. Sections A and B represent two types of control center cabinets which differ from each other by the space provided at the top for the interconnection wiring, the space in section A being of a substantially greater height than that of section B. Upper front cover plates 2 and 4 are used to enclose the wiring spaces at the top of sections A and B, respectively.

The bottom of each control center section A and B is provided with a lower front cover plate 6 and 8, respectively. Plates 6 and 8 differ in height from each other and complement the similar difference between upper plates 2 and 4 to provide a uniform distance between the upper and lower plates of each section.

A narrow door 10 is hinged to the right-hand side of each cabinet to cover the right-hand front portion of each cabinet, or section. Door 10 extends over the full height between the respective upper and lower front cover plates and may be swung open to gain access to a vertical wiring space provided in the section. Door 10 has been removed from section A in FIG. 1, and has been broken off at its upper end in section B thereof to show the interior of the cabinets.

The left-hand portions of the cabinet fronts are provided with a plurality of vertically alined doors hinged to the left-hand side wall of each cabinet. Four of the latter doors are shown at 12, 14, 16 and 18 on section B in FIG. 1 while the remaining doors have been completely removed from section A and the upper portion of section B to better illustrate the cabinet interiors. Doors 12, 14, 16 and 18 are of a uniform height and the space provided in each cabinet between the upper and lower front cover plates permits six such doors to be mounted therein. The height of each door 12–18 corresponds to the height of a single plug-in control unit adapted to be received in the cabinet behind each door. The control units and cabinet doors also are provided in one and one-half and double heights according to the control apparatus desired. The control section cabinetry is designed to readily accept any combination of control units and doors having a total height of six individual units, or doors.

A pair of plug-in control units 20 and 22 have been shown mounted in the second position from the top of each section A and B, respectively. Reference may be had to the aforementioned Pat. No. 3,303,395 for the details of the control units and their associated mounting structure. For the immediate disclosure, the control units 20 and 22 may be described as comprising a sheet metal bucket having upper and lower front handles, a rearwardly extending plug-in electrical connector 23 (FIG. 2) and one or more electrical control components, which have been shown in block form, mounted on the bucket. Each unit further carries its own control panel 24 which occupies a space at the front of the cabinet between the left-hand doors such as 12–18 and the right-hand door 10, the panel 24 being flush with the doors. Control panels 24 serve to mount the various manual actuators, indicating lights and other operational devices necessary for the components of each control unit.

A pair of oppositely disposed vertical U-shaped channels 26 (FIG. 2) are secured to the inner surfaces of the side walls of each cabinet. Channels 26 serve as mounting surfaces for a plurality of right- and left-hand mounting brackets 28 and 30, respectively, upon which the control units are mounted and secured. A cross channel 32 (FIG. 1) extends between each cooperating pair of mounting brackets 28 and 30 at their forward ends to provide additional support for the control unit. While not specifically shown, the several cross channels 32 further provide gasketed surfaces against which the left-hand doors seal when closed.

Vertical bus bars 34 are electrically connected at the top of each control center section A and B to the aforementioned horizontal bus bars. Vertical bus bars 34 depend in parallel, spaced apart relation between the channels 26 and are provided with lateral support at various points along their length by lateral insulating support members 36. Insulating support members 36 extend transversely between the channels 26 and have their opposite ends secured thereto. The supports 36 are provided with transversely spaced slots open to one side for receiving the bus bars 34 therein and are positioned on alternate sides of the bus bars as may be seen in FIG. 2. Supports 36 are of a thin wall, molded insulating type and have integral wall portions surrounding the closed side of the bus bar slots to completely cover the bus on the front facing side of the support.

Referring again to control center section A in FIG. 1, it may be seen that four support members 36 are mounted at the front of bus bars 34. These supports are arranged so as not to interfere with the plug-in connections for the control units to be mounted in the cabinets, such connections being made in the space between the supports. The length of bus bars 34 between adjacent supports 36 have customarily been left exposed, or in certain instances, sleeved with an insulating material having openings in the areas for connection. As may be seen near the center of control center section A, this length may extend over a total distance equal to a double unit height to present a sizeable area of shock hazard to maintenance personnel working on an installed and electrically connected control center section.

As stated earlier, this invention is concerned with providing greater safety to the workman by isolating the bus bars 34 from the front of the cabinet. To this end there are provided flat sheets of insulating material which are secured to the forward legs of channels 26 between the front lateral bus bar supports 36 to extend transversely across the cabinet in front of the bus bars. Since the sections are designed to accept control units variable in one-half unit height increments, openings in corresponding increments must be provided in the insulating sheets to permit electrical connection to the bus bars. An important manufacturing consideration for erecting such control centers is to reduce the number of different pieces to a minimum, or to make one piece fit a number of applications through minor modifications.

The insulating barrier sheets constructed in accordance with the above considerations are shown in FIGS. 3 and 4 of the drawings. These barrier sheets are of two basic profiles which may be readily modified upon assembly as will be brought out more clearly hereinafter. A first barrier sheet 38 (FIG. 3) has a single rectangular opening 40 formed therein for freely receiving a plug-in connector such as 23 therethrough in assembly. Barrier sheet 38 has a first set of vertically alined holes 42 at its opposite edges for purposes of mounting of the sheet 38 on the channels 26. A pair of holes 44 are also provided adjacent the opposite ends of opening 40. Arranged in vertically alined rows from holes 44 are two pairs of similar holes designated 44s. At the upper right-hand corner barrier sheet 38 is further provided with a pair of horizontally spaced holes 46.

Barrier sheet 38 may be seen to be mounted directly above the uppermost lateral support member 36 in control center section B (FIG. 1). Four sheet metal screws or the like pass through the holes 42 and take into alined corresponding holes formed in the forward legs of the channels 26 to secure the barrier 38 rigidly across the cabinet in front of bus bars 34. An upper control unit guide bracket 48 is secured to the cabinet on the exterior of barrier sheet 38 by a pair of screws which pass through holes in the bracket and holes 46 of sheet 38 to take into alined holes in one channel 26.

As hereinbefore mentioned, section A differs from section B in that the wiring space provided at the top of section A extends over a greater height than that in section B. However, the locations of the lateral insulating support members 36 for the vertical bus bars are arranged to be in common horizontal planes regardless of the type of control center section, as may be specifically seen at the uppermost support members of each section in FIG. 1. Therefore the allotted space above the uppermost support 36 in section A is considerably less than in section B. Barrier sheet 38 is modified to fit the smaller area in section A by cutting off the portion shown below the dotted line indicated in FIG. 3. The modified barrier sheet is designated 38' and comprises only the portion shown above the dotted line, retaining the holes 46 for guide bracket 48 and only two mounting holes 42.

The other barrier sheet 50 is shown in FIG. 4 and is provided with four vertically alined rectangular openings 52 therein each identical to the opening 40 in barrier sheet 38. Similarly, barrier sheet 50 has a first set of vertically alined holes 54 at its opposite edges for mounting the sheet to the channels 26 as described in connection with barrier sheet 38, and a second set of holes 56 corresponding to holes 44 of barrier sheet 38. Holes 56 are arranged in vertical rows adjacent the opposite ends of openings 52 and vertically spaced to lie at the horizontal centers of the openings. In vertical alinement with the holes 56 and vertically spaced midway between adjacent ones of these holes are formed similar holes 56s.

Barrier sheet 50 is provided in an original length to exactly fit between adjacent support members 36. However, the space between the lower two support members is slightly less than the normal spacing and barrier 50 must be modified by removing the portion shown below the dotted line indicated in FIG. 4. The modified barrier sheet, designated 50', then comprises the portion shown above the dotted line in FIG. 4. Thus, each section requires one lower barrier sheet 50' and two central barrier sheets 50 plus one of either sheet 38 or 38' depending upon the type of section to be covered.

A plurality of flat insulating cover members 58 are provided to close off each of the openings 40 and 52 in the respective barrier sheets. Cover members 58 are formed to be wider and longer than openings 40 and 52 and are provided with holes 60 therein to be in alinement with holes 44 or 56. A pair of insulating snap-fasteners 62 are provided for each cover member to secure the latter to the respective barrier sheet as shown in FIG. 2. A large variety of suitable fasteners are commercially available and the invention is not to be restricted to the use of the particular type shown herein. The fasteners 62 extend through holes 60 in cover 58 and snap into the alined holes 44 or 56 in the respective barrier sheets to hold the cover securely thereto.

With reference to FIG. 6 wherein the left-hand fastener of FIG. 2 is shown in enlarged detail along with fragments of cover 58 and barrier sheet 50, it may be seen that the fastener has a flanged head portion 64 formed thereon to facilitate gripping the fastener with the fingers. This is provided to eliminate any necessity of prying the cover 58 loose with a tool or the fingers, either of which would then be in the area of the opening and susceptible to accidental contact with the bus bars. The shank of fastener 62 flares outwardly from the headed end portion to an enlarged diameter intermediate the ends, and then flares inwardly to terminate at a reduced diameter spherical end. The shank is afforded resiliency by providing it with a longitudinally extending lateral groove to permit the shank to be diametrically compressed when inserted through a lesser diameter hole.

To retain fasteners 62 always with the cover member 58, holes 60 therein are formed of a lesser diameter than holes 44 and 56 in the barrier sheets. Fasteners 62 are first inserted into the holes 60 of cover 58 and the cover and fasteners, as an assembly, are then attached to the barrier sheet. The linear movement of the shank of fasteners 62 through barrier plate holes 44 or 56 compresses the shank only an amount sufficient to clear those holes and not sufficiently to allow withdrawal of the fastener from the cover holes.

Thus, as heretofore described, there are provided control center sections having the vertical bus bars therein completely isolated from the front of the enclosure. Upon installation of the individual control units such as 20 and 22 to the sections, the respective cover members 58 are removed from their position over the needed opening and placed in a storage position adjacent that opening by inserting the fasteners in the additional holes 44s or 56s. Several of the cover members 58 have been shown in their storage position in FIG. 1, exposing the plug-in openings in the barrier sheets. This is done for illustration purposes only, since in normal practice only one cover would be removed at a time as a control unit is to be plugged in. When a control unit is to be removed for service the cover assembly is always readily available for replacement over the plug-in opening.

In certain instances the additional storage holes 44s or 56s may be eliminated by offsetting the holes 44 or 56 from the center of the opening 40 or 52 toward an upper or lower edge of the opening and offsetting the holes 60 in cover 58 an equal amount. The cover 58 then may be converted from the closing position to a storage position merely by inverting the latter upon replacement on the barrier sheet.

The use of separate snap-fasteners to secure the covers 58 to the barrier sheets provides a simple, reliable and inexpensive means to accomplish the objective. However, where costs are permissive, the cover and snap-fastener assembly may be molded as a unitary member with depending tabs or the like for accomplishing a snap-in function.

It is to be understood that the invention described herein is not limited to the disclosed preferred embodiment and is susceptible of various modifications without departing from the scope of the appended claims.

1. In an electrical control apparatus enclosure having electrically conducting bus bars mounted therein and frontal openings for receiving control units, the combination comprising:
  an insulating barrier mounted to said enclosure, said barrier extending across the front and of being spaced from said bus bars to isolate the latter from the front of said enclosure;
  an opening in said barrier formed in transverse alinement with said bus bars to permit electrical connection of a control unit to said bus bars; and
  a removable insulating cover member mounted on said barrier in one of two positions, said cover member in first position overlying said opening to close off the latter, and said cover member in a second position occupying a cover storage position on said barrier.

2. The combination according to claim 1 together with snap-fastener means for mounting said cover member on said barrier.

3. The combination according to claim 1 wherein said barrier is further provided with apertures adjacent said opening and said cover member is provided with resilient insulating means extending rearwardly thereof in corresponding alinement with said apertures, said resilient means being deflected by the peripheral edges of said apertures upon linear movement therethrough and being self-restoring upon passage therethrough to grip a rear peripheral wall of said apertures in said barrier, thereby securing said cover member on said barrier.

4. The combination according to claim 3 wherein said cover member is further provided with flanged means extending forwardly thereof to provide finger grip portions for mounting and removing said cover member.

5. The combination according to claim 4 wherein said barrier is provided with additional apertures in alined correspondence with said first mentioned apertures, said additional apertures being spaced from said opening in said barrier and said cover member being mounted in said storage position by inserting said resilient means within said addtional apertures.

6. The combination according to claim 1 together with:
  apertures in barrier adjacent said opening;
  apertures in said cover member alined with said apertures in said barrier;
  insulating snap-fastener means inserted through alined ones of said apertures in said cover member and said barrier to mount said cover member to said barrier; said snap-fastener means having head portions engaging the front surface of said cover member and resilient shank portions extending rearwardly through said alined apertures, said shank portions being deflected by the peripheral edges of said apertures upon lineal movement therethrough and being self-restoring to grip a rear peripheral wall of said apertures in said barrier to thereby secure said cover member to said barrier.

7. The combination according to claim 6 wherein said apertures in said barrier are formed with a greater diameter than said apertures in said cover to cause said snap-fastener means to remain assembled to said cover member upon lineal movement through said apertures in said barrier.

8. The combination according to claim 7 wherein said snap-fastener means are provided with forwardly extending flanged means at the head potrions thereof to provide finger grip portions for mounting and removing said cover member.

9. The combination according to claim 7 wherein said barrier is provided with additional apertures in alined correspondence with said first mentioned apertures, said additional apertures being spaced from said opening in said barrier to permit mounting said cover member in said storage position by inserting the respective shank portions of said snap-fastener means assembled to said cover within said additional apertures.

References Cited
UNITED STATES PATENTS

| | | | |
|---|---|---|---|
| 2,906,811 | 9/1959 | Fisher | 174—88 X |
| 3,303,269 | 2/1967 | Emley et al. | 174—99 |
| 3,308,348 | 3/1967 | Olashaw et al. | 317—99 |
| 3,341,903 | 9/1967 | Buntic | 24—73 X |

LEWIS H. MYERS, Primary Examiner

G. P. TOLIN, Assistant Examiner

U.S. Cl. X.R.

174—52